United States Patent [19]

Graham

[11] Patent Number: 5,093,861
[45] Date of Patent: Mar. 3, 1992

[54] RECOGNITION APPARATUS AND METHOD FOR SECURITY SYSTEMS

[75] Inventor: David Graham, Simi Valley, Calif.

[73] Assignee: Cardkey Systems, Inc., Simi Valley, Calif.

[21] Appl. No.: 596,925

[22] Filed: Oct. 12, 1990

[51] Int. Cl.$^5$ .............................. H04K 1/00
[52] U.S. Cl. .................... 380/23; 380/25; 340/825.34; 902/5
[58] Field of Search ............... 380/23, 24, 25; 364/918.1, 918.2, 918.3, 225.1, 225.2; 902/4, 5; 340/825.31, 825.32, 825.33, 825.34

[56] References Cited

U.S. PATENT DOCUMENTS

| | | | |
|---|---|---|---|
| 3,665,162 | 5/1972 | Yamamoto et al. | 380/25 X |
| 4,304,990 | 12/1981 | Atalla | 380/25 X |
| 4,376,279 | 3/1983 | Perlman et al. | 340/825.34 X |
| 4,661,658 | 4/1987 | Matyas | 380/23 |
| 4,797,920 | 1/1989 | Stein | 380/24 |
| 4,935,962 | 6/1990 | Austin | 380/24 X |
| 4,995,081 | 2/1991 | Leighton et al. | 380/23 |

Primary Examiner—Thomas H. Tarcza
Assistant Examiner—Tod Swann
Attorney, Agent, or Firm—Irell & Manella

[57] ABSTRACT

A method of authenticating input data including user data and pin code data for an access control system. The method includes the steps of receiving the user data and the pin code data from a keyboard and/or a card reader, combining an offset data with the user data, making a modulo adjustment of said offset user data, obtaining one or more variables from the offset user data, calculating a matrix index by bringing certain variables into a predetermined equation, determining a constant from a matrix by the matrix index and comparing the constant with a corresponding digit value of the pin code data. If the constant matches the digit value, a validation signal is generated and the next constant is obtained from the matrix by the next matrix index obtained by use of a predetermined second equation so that the next digit value of the pin code data is compared with this constant. This procedure continues until all subsequent digits of the pin code data are checked to determine whether the input data entered into the access control system is true or not. If the data is true, the access is granted.

29 Claims, 2 Drawing Sheets

RECOGNITION APPARATUS AND METHOD FOR SECURITY SYSTEMS

BACKGROUND OF THE INVENTION

1. Fields of the Invention

The present invention relates generally to an access control system or a security system, and particularly to an improvement on a recognition apparatus and method for security systems.

2. Description of the Prior Art

The use of pin codes in conjunction with user input identification codes has always been implemented as a means of increasing the security of an access control system in the access control industry. A user identification number is a number (typically stored on a magnetic card) which is given to a user and the user identification number has an associated pin code number. When a person wants to gain access to an access control system, he or she enters (typically by a keyboard) the pin code number and its associated user identification number (hereinafter referred to as "user number") into the system to let the recognition apparatus check the user identification number based on the user number.

For an access control system sold to different purchasers, such as different hotels or offices, if the pin codes for the same available user numbers at different hotels or offices are the same, the security of each of the hotels or offices equipped with such a system may be compromised because the users assigned with the same user number at different hotels or offices may gain access into more than one hotel or office by also using the same pin code number. Therefore, it is desirable that different pin codes be used for available user numbers at different locations of purchasers of the access control system. It is also desirable that the pin codes used for available user numbers be quickly and easily modified by the purchasers or manufacturer without changing of any circuitry or software of the access control system. Accordingly, various scrambling methods for differentiating the pin codes at different locations have been developed for enhancing the security of access control systems used by many customers. A possible choice of a pin code number associated with a user number under a scrambling principle or method is a so-called scramble mode. For an access control system, the more "scramble modes" that are available, the more security is achieved. If there are thousands of scramble modes available for an access control system, such a system is not easily accessed by a person without a correct pin code number even if the scrambling method has been reverse engineered.

The pin code recognition technique normally utilizes a programmed microprocessor or logic circuits as pin code recognition equipment for determining the authenticity of a user number and an associated pin code number entered by a person for access to an access control system. The access control system may be a security lock system, a bank cashing system, a membership checking system, a community facility or the like. Whenever access is desired, a user number and a pin code number are generally entered into a recognition apparatus; then, the recognition apparatus processes the user number in a predetermined manner and derives therefrom data which is compared with the pin code input so that the authenticity of the pin code input is determined. If the pin code is authentic, then the user is granted access to the facility.

A typical prior art computer system for authenticating a pin code includes the steps of choosing one or more sets of data bits (variables) of a user number input, generating a matrix index value by using the variables in predetermined equations, using the obtained matrix index to obtain a constant from a predetermined matrix, and then, comparing the constant value with the corresponding digit of the pin code input. If the two values match each other, then the remaining other digits of the pin code input are checked in a similar manner. Suppose the user number is a four-digit decimal number, this number occupies 16 bits in a binary computer. A number of variables, such as A–F (as shown below) can be obtained by defining several octal numbers, each of which contains three binary bits, as shown in the following table 1:

TABLE 1

| B Octal Variable | B | B | F | B | | | B |
|---|---|---|---|---|---|---|---|
| B Bits Occupied by | B B B | B B B | B B B | B B B | B B B | B B B | B B B |
| B Binary User No. | BxBxBx | BxBxBx | BxBxBx | BxBxBx | BxBxBx | BxBxBx | BxBxBxB |
| B Octal Variable | B A | B B | C | B D | B E | B B | |

The predetermined equations for generating the matrix indice can be algebraic equations. Different equations having different combinations of the defined variables will result in different octal digit values. Such digit values will be used as matrix indices in a row of an 8 by 8 matrix stored in a ROM to determine a constant for comparison with the pin code input. Since the matrix is an 8 by 8, diagonally, symmetric matrix, there are eight scramble modes available to such method or recognition apparatus. In other words, if there is a pin code book for such a security system, only eight sets of pin code numbers or eight scramble modes can be selected for the system. When more than eight customers use this system, some customers have to use the same scramble mode. Further, the system is easily accessed if someone familiar with this art knows the scrambling method because the system has very limited number of scramble modes.

One of the important problems with such conventional methods is that the number of scramble modes available is very limited so that the security of access control systems using such techniques is very much reduced.

OBJECT OF THE INVENTION

It is an object of the present invention to provide an improved access control system which has higher security than conventional access control systems.

It is another object of the present invention to provide an improved pin code recognition apparatus for an access control system.

It is still another object of the present invention to provide an electric lock control system which has an improved pin code recognition apparatus.

It is still another object of the present invention to provide an improved access control system which allows a plurality of choices of pin code numbers, or scramble modes for each available user number and can be manufactured at low cost.

It is a further object of the present invention to provide an improved pin code recognition apparatus having a microprocessor which allows an easy adjustment of pin codes from one scramble mode to another without changing the hardware and software.

These and other objects or advantages of the present invention will become apparent after studying the following descriptions of the present invention.

SUMMARY OF THE INVENTION

A preferred embodiment of the present invention discloses a novel method and apparatus for reliably recognizing the authenticity of pin code inputs to an access control system. The apparatus contemplates the use of thousands of possible pin code choices or scramble modes to be selected for each available user number. Further, only a predetermined 1 by 8 matrix is necessarily stored in the memory of the apparatus, instead of a 8 by 8 matrix. The method of the preferred embodiment includes the following steps for recognizing the authenticity of the user number and associated pin code number entered by a person for access to an access control system.

In the preferred embodiment, a user number and a pin code number are entered from a keyboard and/or a card reader. The entered data signal is parsed into a user data signal and a pin code data signal.

Then, the user data signal is combined with an offset data signal to provide an offset-adjusted user data. The offset-adjusted user data takes a value within the available user numbers and a modulo adjustment, if any, with the user data occurs. Under this arrangement, a plurality of scramble modes can be achieved by changing the offset data. For example, if the system is designed for use by $10^4$ users, the offset data can take any integer value smaller than $10^4$ so that modulo $10^4$ is associated with the user data and up to $10^4$ possible scramble modes for user data are achieved. Stated differently, $10^4$ different systems can be implemented using virtually the same hardware and software. The offset-adjusted user data (offset user data) is then used in the following steps. If the offset-adjusted value exceeds $10^4$, the value is automatically adjusted by modulo $10^4$. Thus, this modulo-adjusted data instead of offset-adjusted value, will be used in the following steps.

The next step includes selecting a number of variables by utilizing the offset-adjusted user data signal (or modulo-adjusted data signal if offset-adjusted user data exceeds designed maximum user data). This can be obtained by defining three bits of binary data as a variable. Certain such variables are utilized in a logic equation to produce a result which represents a matrix index with modulo 8.

After a matrix index output is produced, the following steps occur. The index output is used to determine a constant from a predetermined 1 by 8 matrix stored in memory. This constant is compared with the corresponding digit in the pin code input signal. If the two values are the same, some of the variables will be brought into a second equation to get another matrix index to determine a second constant. This constant will be compared with a subsequent digit in the pin code input to see whether they match or not. In this way, if all the subsequent constants determined by the produced matrix indices match the corresponding digit values in the pin code input, the user data input and the associated pin code input are recognized as authentic and access to the access control system is granted.

DETAILED DESCRIPTION OF THE INVENTION

Figure 1:
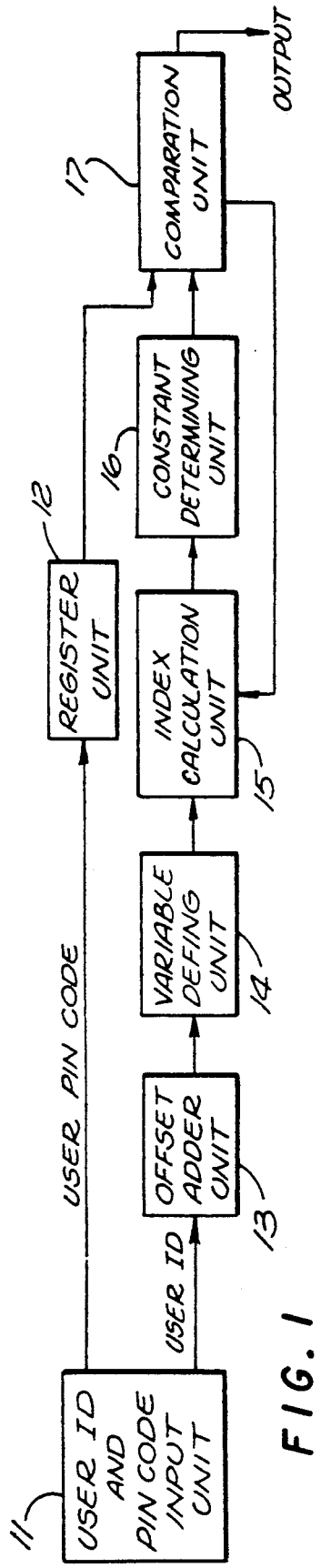
FIG. 1 is a block diagram illustrating an embodiment of the present invention for recognizing the authenticity of a pin code input and user number input for access to an access control system.

Referring now to FIG. 1, FIG. 1 shows an embodiment of the invention for recognizing the authenticity of input data entered by a user to gain access to an access control system (not shown). The apparatus of FIG. 1 can provide thousands of scramble modes each of which is a possible choice of a pin code number associated with a user number under a scrambling method, so that security of the system is significantly enhanced. For a particular system, one of the available scramble modes is selected and fixed before use.

The apparatus includes the following items: a data input unit 11 for entering user numbers and pin code numbers and/or separating the two types of data, a register unit 12 for temporarily storing the pin code data input, an offset adder unit 13 for adding a selected offset signal to the user data input, a variable organizing unit 14 for defining a number of variables from the offset user data, a matrix index calculation unit 15 for calculating a matrix index by applying the variables to predetermined equations, a constant determination unit 16 for determining a constant from a predetermined 1 by 8 matrix by using the matrix index, and a comparison unit 17 for comparing the obtained constant with a first digit value of the pin code data stored in the register unit 12. If a constant does not match the corresponding digit value of the pin code data, then the pin code input is not authentic. However, if the constant equals the first digit value of the pin code data, certain variables are used with a second predetermined equation for calculating a second matrix index in the index calculation unit 15. A second constant is determined from the matrix in the constant determination unit 16 by the second matrix index for comparison with the subsequent digit value of the pin code data. If the second constant matches the second digit value of the pin code data, the apparatus continues to operate in the same way until all the digits of the pin code input have been checked based on the user data input. The apparatus can be easily constructed by using logic circuits or microprocessor techniques.

The data input unit 11 may include a keyboard and/or a card reader. The card reader may be used to read a user number on a user card while the keyboard is used to enter the pin code number, or vice versa. It is also possible that only a keyboard is used to enter both the user number and the pin code number.

An offset is chosen to be an integer value smaller than the total number of possible users allowed. In this way modulo data is automatically associated with the user data. For example, if an access control system or an electric lock control system is designed for allowing up to $10^4$ user numbers, the offset data must be selected between 0 and 9999. Thus, number $10^4$ is the modulo number associated with the user data. In this case, up to $10^4$ scramble modes are available for the system to select one therefrom. Under this configuration, security of the system is very much increased. Suppose the value 7235 is selected as the offset number for an access control system. If a user data input 6527 is entered, the offset data 7235 is added to the user data input for a result of 13762. Since this data is larger than 9999, it is modulo adjusted $10^4$ to generate 3762. This offset user data (or modulo-adjusted data if offset user data exceeds 9999) is then used for selecting a number of the variables therefrom.

In another embodiment, if the maximum number of users is $10^3$, the offset data can be selected from 0-999 so that the modulo data is $10^3$ associated with each user number. In this case, at least $10^3$ possible scramble modes are available to the system if a 1 by 8 matrix is used. If a 8 by 8 diagonally symmetric matrix is used, $8 \times 10^3$ scramble modes are available.

Since the present apparatus can provide a great number of scramble modes by simply adjusting the offset, the apparatus allows different purchasers of the access system to use different scramble modes to generate new pin codes so that high security among user of a system from the same manufacture is achieved. Further, since a great number of scramble modes can be obtained, such an access control system can not be easily accessed by a person without knowing the correct pin code even though he may know the scrambling method.

The pin code numbers for entering the system are preferably multi-digit numbers. Each of the organized variables is an octal value, so that a 1 by 8 scalar matrix can be used for determining a set of constants for each user data input. The user numbers for entering the system are preferably multi-digit decimal number because people are familiar with decimal numbers. Since each four-digit decimal number occupies 16 binary bits in a binary system so that a number of octal variables can be organized by defining any three binary bits in the user data as an octal variable.

The equations used to calculate the matrix indices can be any predetermined logic equations with modulo 8, each of which preferably includes at least two variables derived from the offset user data. The number of the equations preferably equals the places of the maximum pin code number so that each equation can be used for determining one matrix index. Suppose the maximum pin code number is a five-digit value, there will be five equations, exemplarily shown as the following:

| Equation 1: A + (F XOR E) + 1 |
| Equation 2: A + (B XOR D) + 3 |
| Equation 3: A + (F XOR C) + 5 |
| Equation 4: A + B + 7 |
| Equation 5: A + F |

The 1 by 8 data matrix is any predetermined scalar matrix which has eight constant elements, such as (1, 3, 6, 4, 2, 7, 5, 0). Once a matrix index with modulo 8 is calculated, a constant from the matrix can be solely determined.

Figure 2:
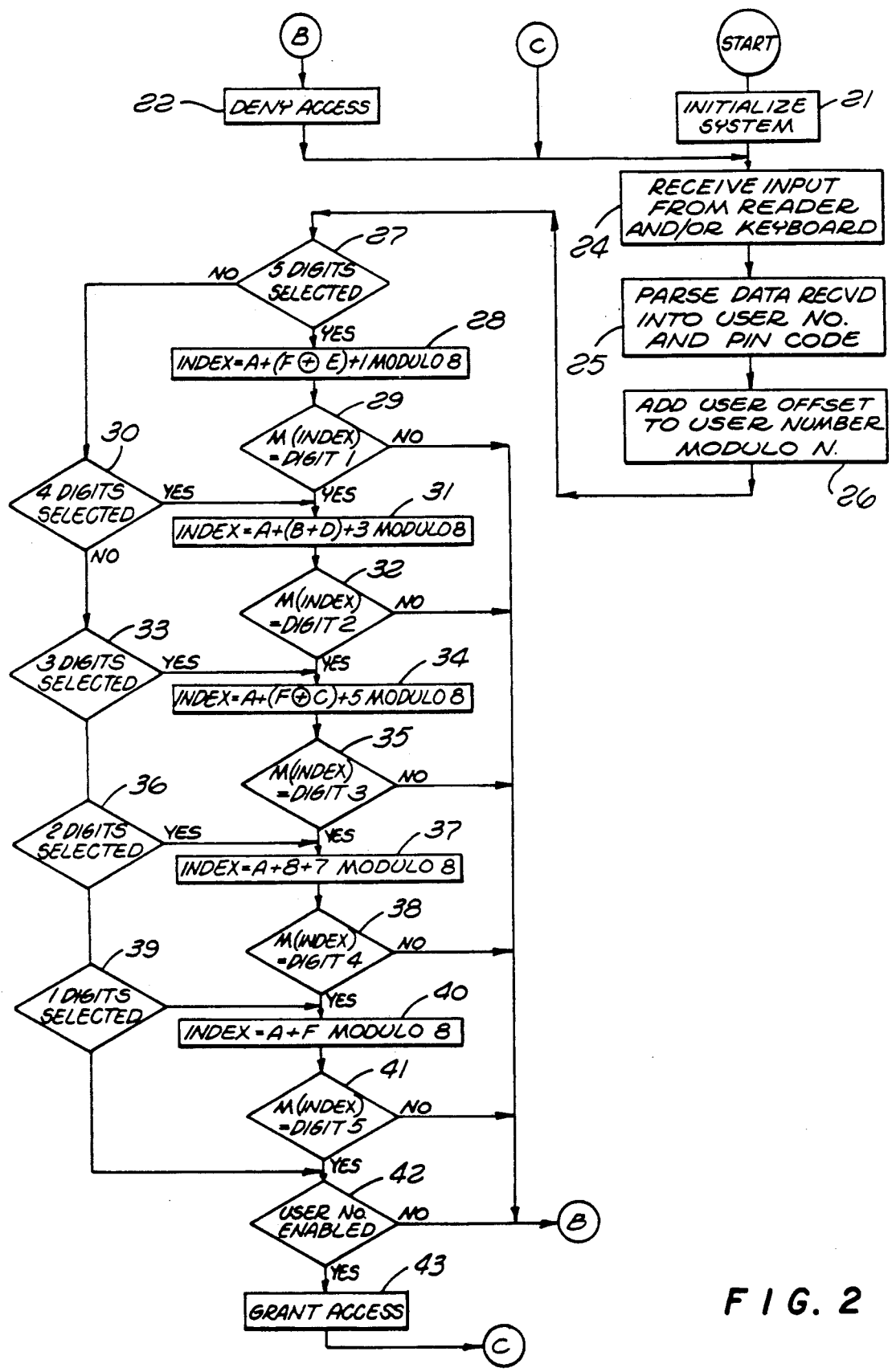
FIG. 2 shows a flow chart of the operation of the preferred embodiment of the present invention for recognizing the authenticity of a pin code input and user number input for access to an access control system.

In a preferred embodiment, a programmed microprocessor is used in a data recognition apparatus for an access control system. FIG. 2 shows a flow-block diagram of a data recognition routine 20 of the recognition apparatus. Whenever the access control system is started, the recognition apparatus is cleaned or reset at block 21 so that the system is ready for a person to enter data. At block 24, the system receives data input from a keyboard and/or a card reader. If the data input (a user number and a pin code number) is entered from an input device, such as a keyboard, the data input is parsed at block 25 and separated into user data and a pin code data which is sent to a register.

In block 26, the user data is incremented by an offset data which has been programmed into the system. The offset value is any number selected between 0 and n-1, wherein n is the maximum number of possible users, which is defined in the design. In this case, a modulo n is added to the user data by use of the offset data. Then, during block 27, a determination is made as to the number of digits the pin code data input contains. Assuming that the pin code input contains less than five digits, then processing continues to blocks 30, 33, 36 and 39 until the number of digits of the pin code data has been determined. If the pin code data is determined to have five digits, processing continues in block 28 where a predetermined equation, such as $A + (F \oplus E) + 1$, will be used to calculate the matrix index. It should be noted that the variables A, F and E in the equation are octal numbers derived from the user data input as discussed previously. The calculated index value has a modulo 8.

After the index value is obtained, a constant M(index) will be determined from a 1 by 8 matrix M by the index value and compared with the first digit of the pin code data at block 29. If the two values match, processing will continue to block 31 and 32 to see whether a second constant obtained by using a predetermined second equation matches the second digit value of the pin code data. If the two values are equal, the operation continues in this manner through blocks 34, 35, 37, 38, 40 and 41 until all subsequent digits of the pin code input have been checked as being equal to corresponding constants determined through the predetermined method. Thus, the data input entered by the person is recognized as true data. If the constant at any of the blocks 29, 32, 35, 38 and 41 is determined to be not equal to the corresponding digit value of the pin code data, processing is terminated and access is denied, that is, the operation of the system returns to block 22, ready for re-entering a new data input.

Under this configuration, more scramble modes for an access control system can be obtained and less storing space is needed for storing the data matrix. Further, the access control system achieves much higher security than conventional systems.

In some situations, even though the pin code number has been recognized as authentic data, the user number may be an invalid number. For example, an employment, or a membership or the like have been terminated. Consequently, block 42 represents a step for checking the validity of the user number. If the user number is enabled, access is granted and a control signal is fed to a strike control relay (51, FIG. 3) for driving an access device, such as to open an electric lock.

Figure 3:
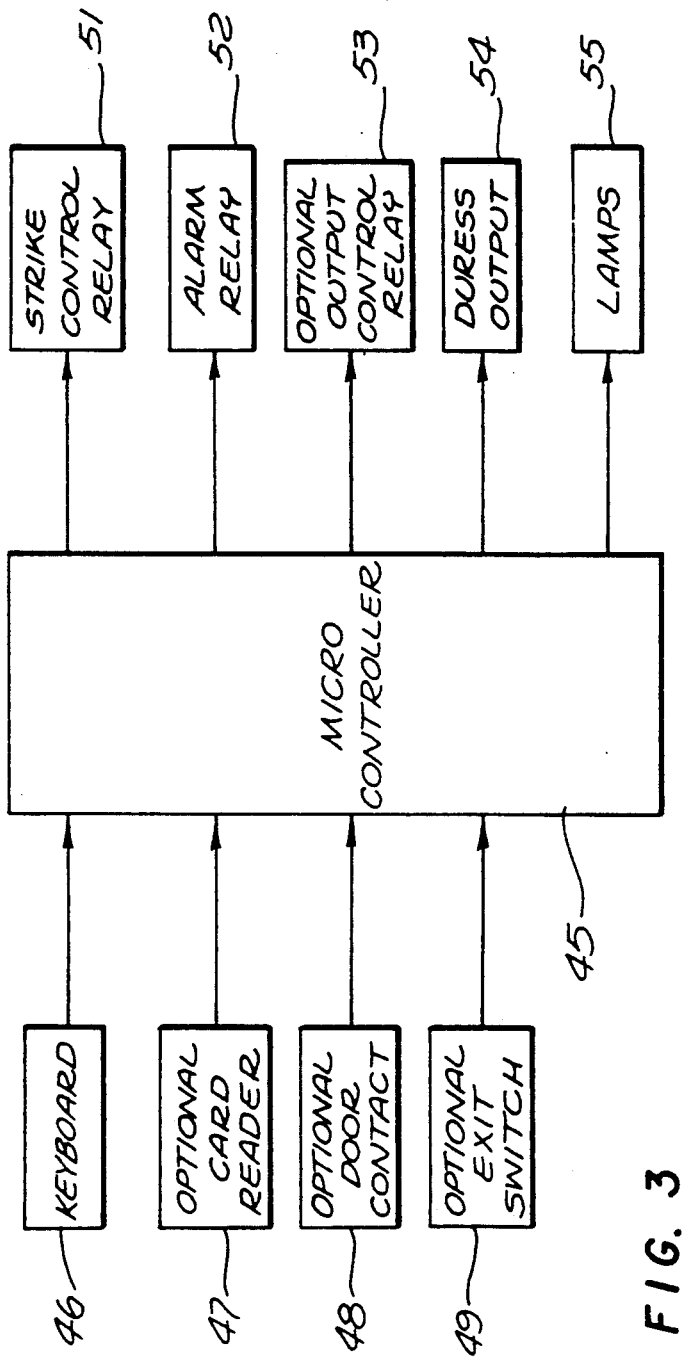
FIG. 3 shows a hardware block diagram of an access control system of the present invention.

A preferred embodiment of an access control system 50 of the present invention is shown by FIG. 3. The access control system 50 includes a microprocessor 45 for recognizing the authenticity of the data input and controlling the operation of the system 50, a keyboard 46 and/or a card reader 47 for entering the data, a strike control relay 51 responsive to the control signals from the microprocessor 45 for controlling the opening and closing of an access device such as an electric lock or a door striker, an alarm relay 52 for driving an alarm when the access device is being destructed or other abnormal situations occur, a lamp driver for controlling the on and off of a green lamp indicating the access is granted and a red lamp indicating a denial of a data input of the user number and the pin code number. The access control system 50 may further include an optional access device contact input element 48 for allowing the microprocessor 45 to monitor when access has been completed so it can lock, rather than being automatically locked in a certain preset time after access granted, and an optional switch element 49 for giving commands for directly controlling the access device. Such input device 49 can be accessed only by the system operator. The input signals from these optional input devices (keyboard, and card reader) are then processed by the microprocessor 45 to control an optional output control relay 53 and a duress output driver 54 so that the system can be properly administered by the operator.

While the preferred application of the present invention has been shown and described, it should be apparent to those skilled in the art that many more modifications are possible without departing from the invention concept herein described. It is intended to cover in the appended claims all such modifications which fall within the true spirit and scope of the invention.

What is claimed is:

1. An apparatus for recognizing the authenticity of a data input signal including a user data and a pin code data entered by a person for access to an access control system, comprising:
   means for entering said data;
   means for combining a predetermined offset with said user data input to obtain an offset user data;
   means for defining one or more variables within said offset user data;
   means for producing a set of index values;
   means for obtaining a set of constants from a matrix by use of said index values; and
   means for comparing said pin code data with said obtained constants from said matrix to determine whether said pin code and said obtained constants are equal.

2. An apparatus in accordance with claim 1, wherein said data entering means includes a card reader for reading said data on a card used by a person.

3. An apparatus in accordance with claim 1, wherein said data entering means includes a keyboard for entering said data by a person.

4. An apparatus in accordance with claim 1, wherein said combining means further includes a means for applying modulo adjustments to said offset user data.

5. An apparatus in accordance with claim 1, wherein said user data input is a decimal number, each digit of said user data occupying four binary bits.

6. An apparatus in accordance with claim 5, wherein said decimal user data is preferably a three or a four digit decimal number.

7. An apparatus in accordance with claim 1, wherein said index values are produced by bringing one or more of said variables into predetermined equations, respectively.

8. An apparatus in accordance with claim 7, wherein said pin code data input is preferably a four or a five digit number.

9. An apparatus in accordance with claim 4 wherein said offset can be any of the numbers smaller than said modulo.

10. An apparatus in accordance with claim 1 or 4, wherein each of said variables is a number corresponding to three binary bits among the total binary bits occupied by said offset user data or modulo adjusted user data.

11. An apparatus in accordance with claim 1, wherein said matrix is a 1 by 8 matrix.

12. A method for recognizing the authenticity of a data input including a user data and a pin code data for an access control system comprising the steps of:
   (a) entering said data input into said access control system;
   (b) combining a predetermined offset with said user data to obtain an offset user data;
   (c) defining one or more variables within said offset user data;
   (d) producing a set of index values, said set including a quantity of said index values equal to the number of data digits of said pin code data;
   (e) obtaining a set of constants from a matrix according to said index values; and
   (f) comparing said pin code data with said constant signal to determine the authenticity of said data input entered into said system.

13. A method in accordance with claim 12, further including a step of applying a modulo adjustment to said offset user data if said offset user data exceeds said modulo data value.

14. A method in accordance with claim 12, wherein said predetermined offset is a number smaller than said modulo data value.

15. A method in accordance with claim 12 or 13, wherein said step of defining one or more variables includes a substep of defining each of said variables by choosing any three binary bits among the binary bits occupied by said offset user data or modulo-applied user data.

16. A method in accordance with claim 12, wherein said step of producing index values includes a substep of using predetermined respective equations each of which includes at least one of said variables therein, to respectively produce a index value.

17. A method in accordance with claim 12, wherein said matrix includes at least a predetermined 1 by 8 matrix.

18. An apparatus for ensuring correct access of an electric lock control system automatically for protecting one or more entrances, comprising:
   means for locking said one or more entrances;
   means for entering user data and a pin code data for obtaining access through said one or more entrances;
   means for recognizing the authenticity of said user data and said pin code data; and said recognizing means including means for combining an offset data with said user data to obtain an offset user data, means for producing a set of index values, means for obtaining a set of constants from a matrix according to said index values, and means for comparing each digit of said pin code data with said each corresponding constant to determine whether said pin code data and said obtained constants are equal.

19. An apparatus in accordance with claim 18, wherein said data entering means includes a card reader for reading said user data on a user card.

20. An apparatus in accordance with claim 18, wherein said data entering means includes a keyboard for entering said pin code data and/or user data.

21. An apparatus in accordance with claim 18, further including a lock control relay means for controlling the said locking means under control of said recognition means.

22. An apparatus in accordance with claim 18, further including an alarm relay means for actuating an alarm.

23. An apparatus in accordance with claim 18, further including an override switch means for obtaining access through said one or more entrances without entering said user data and pin code data.

24. An apparatus in accordance with claim 18, further including means for disabling authentic pin code data.

25. An apparatus in accordance with claim 18, wherein said index values are produced by bringing certain variables derived from said offset user data into predetermined equations.

26. An apparatus in accordance with claim 18, further including a means for providing signals corresponding to answers of said apparatus to said input data.

27. An apparatus in accordance with claim 20, further including a means for entering a command signal for disabling said lock means.

28. A method for providing high security for an electric lock control system by using a microprocessor, comprising the steps of:
 (a) entering a user data and a pin code data through an input device by a person for access of said system;
 (b) sequentially recognizing the authenticity of each digit of said pin code data by the following steps;
 (c) combining an offset with said user data to obtain an offset user data in such a way that a modulo is associated with said offset user data;
 (d) defining one or more variables within said offset user data;
 (e) producing an index value by bringing one or more of said variables into a predetermined equation;
 (f) obtaining a constant from a matrix by using said index value;
 (g) comparing said constant with a corresponding digit value of said pin code data;
 (h) repeating steps e-g if said constant matches the corresponding digit value of said pin code data; and
 (i) granting an access if all digit values of said pin code data match said respective constants, otherwise access is denied.

29. A method in accordance with claim 28, further including a step of applying said modulo to said offset user data if said offset user data exceeds said modulo.

* * * * *